(12) United States Patent
Yamamoto

(10) Patent No.: US 12,428,510 B2
(45) Date of Patent: Sep. 30, 2025

(54) RESIN COMPOSITION, ADHESIVE MEMBER, AND DISPLAY DEVICE INCLUDING THE SAME

(71) Applicant: Samsung Display Co., Ltd., Yongin-si (KR)

(72) Inventor: Katsuhiro Yamamoto, Yokohama (JP)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 334 days.

(21) Appl. No.: 17/393,980

(22) Filed: Aug. 4, 2021

(65) Prior Publication Data
US 2022/0144989 A1     May 12, 2022

(30) Foreign Application Priority Data

Nov. 6, 2020 (KR) .................. 10-2020-0148056

(51) Int. Cl.
| C09J 4/00 | (2006.01) |
| C08F 2/50 | (2006.01) |
| C08F 220/20 | (2006.01) |
| C08F 220/34 | (2006.01) |
| C09J 175/14 | (2006.01) |
| G02F 1/1333 | (2006.01) |

(52) U.S. Cl.
CPC ............ *C08F 220/346* (2020.02); *C08F 2/50* (2013.01); *C08F 220/20* (2013.01); *C09J 4/00* (2013.01); *G02F 1/133305* (2013.01); *C09J 175/14* (2013.01); *G02F 2202/28* (2013.01)

(58) Field of Classification Search
CPC .......................... C08F 290/067; C09J 175/14
See application file for complete search history.

(56) References Cited

U.S. PATENT DOCUMENTS

| 10,843,448 B2 | 11/2020 | Ogawa et al. |
| 2015/0000836 A1* | 1/2015 | Ogawa ............... G02F 1/1303 |
| | | 156/273.5 |
| 2019/0106599 A1 | 4/2019 | Okamoto et al. |
| 2020/0264356 A1 | 8/2020 | Lee et al. |

FOREIGN PATENT DOCUMENTS

| JP | 2012-237965 | 12/2012 |
| JP | 2014224179 A * | 12/2014 |
| JP | 2017-21239 | 1/2017 |
| JP | 2017-25325 | 2/2017 |
| JP | 2017-165807 A2 | 9/2017 |
| JP | 2017-210578 | 11/2017 |
| JP | 6329102 | 5/2018 |
| JP | 2019-65287 | 4/2019 |
| JP | 6502295 | 4/2019 |

(Continued)

OTHER PUBLICATIONS

Machine translation of WO-2019244499-A1 obtained from IP.com (Year: 2019).*

(Continued)

*Primary Examiner* — Arrie L Reuther
*Assistant Examiner* — David R. Foss

(57) ABSTRACT

A resin composition comprises a urethane (meth)acrylate oligomer. The resin composition has a storage modulus of about $2 \times 10^3$ Pa to about $2 \times 10^4$ Pa when irradiated with 200 mJ/cm$^2$ of an ultraviolet light.

11 Claims, 10 Drawing Sheets

(56) References Cited

FOREIGN PATENT DOCUMENTS

| | | |
|---|---|---|
| JP | 2019-218513 | 12/2019 |
| JP | 6724946 | 7/2020 |
| KR | 10-1895136 | 9/2018 |
| KR | 10-2018-0132628 | 12/2018 |
| KR | 10-2019-0108396 | 9/2019 |
| KR | 10-2020-0036015 | 4/2020 |
| KR | 10-2020-0064061 A | 6/2020 |
| KR | 10-2020-0101548 A | 8/2020 |
| WO | WO-2019244499 A1 * | 12/2019 ............. B32B 7/023 |

OTHER PUBLICATIONS

Machine translation of JP-2014224179-A obtained from WIPO patentscope. (Year: 2014).*

* cited by examiner

RESIN COMPOSITION, ADHESIVE MEMBER, AND DISPLAY DEVICE INCLUDING THE SAME

CROSS-REFERENCE TO RELATED APPLICATION(S)

This application claims priority to and benefits of Korean Patent Application No. 10-2020-0148056 under 35 U.S.C. § 119, filed on Nov. 6, 2020 in the Korean Intellectual Property Office, the entire contents of which are incorporated herein by reference.

BACKGROUND

(a) Technical Field

The disclosure herein relates to a resin composition, an adhesive member formed from the resin composition, and a display device including the adhesive member.

(b) Description of the Related Art

Various types of display devices used for multimedia devices such as a television set, a mobile phone, a tablet computer, a navigation system, and a game console are being developed. Recently, display devices which are foldable, bendable, or rollable using flexible display members that are bendable are being developed to enhance portability and increase user friendliness.

Components used in such flexible display devices must function reliably when they are folded or bent. An adhesive resin used to form an adhesive layer applied to display devices of various types needs to have suitable coating properties for the members of the display devices of various types.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a resin composition having suitable coating properties and an optimized elastic modulus upon bonding.

The disclosure also provides an adhesive member having high adhesive strength by having the resin composition cured.

The disclosure also provides a display device having improved reliability in an operation state such as folding, including an adhesive member having high adhesive strength.

In an embodiment provides a resin composition may comprise a urethane (meth)acrylate oligomer. The resin composition may have a storage modulus of about $2\times10^3$ Pa to about $2\times10^4$ Pa when irradiated with about 200 mJ/cm$^2$ of ultraviolet light.

In an embodiment, the resin composition may have a storage modulus of about $1\times10^4$ Pa to about $1\times10^5$ Pa when irradiated with about 4000 mJ/cm$^2$ of ultraviolet light.

In an embodiment, the ultraviolet light may have a central peak of about 360 nm to about 400 nm.

In an embodiment, the resin composition may have a viscosity of about 20 mPa·s or less at about 30° C. to about 50° C.

In an embodiment, the resin composition may further include an organic solvent. An amount of the organic solvent may be less than about 1 wt % of a total amount of the resin composition.

In an embodiment, an amount of the urethane (meth)acrylate oligomer may be about 5 wt % to about 20 wt % of a total amount of the resin composition.

In an embodiment, the resin composition may further include a (meth)acrylate monomer containing a hydroxy group.

In an embodiment, the resin composition may be photocured.

In an embodiment, an adhesive member may include a polymer formed by curing a resin composition containing a urethane (meth)acrylate oligomer and having a viscosity of about 20 mPa·s or less at about 30° C. to about 50° C. The resin composition may have a storage modulus of about $2\times10^3$ Pa to about $2\times10^4$ Pa when irradiated with about 200 mJ/cm$^2$ of ultraviolet light. The resin composition may have a storage modulus of about $1\times10^4$ Pa to about $1\times10^5$ Pa when irradiated with about 4000 mJ/cm$^2$ of ultraviolet light.

In an embodiment, the ultraviolet light may have a central peak of about 360 nm to about 400 nm.

In an embodiment, the resin composition may include an organic solvent, and an amount of the organic solvent may be about 0 wt % to about 1 wt % of a total amount of the resin composition.

In an embodiment, an amount of the urethane (meth)acrylate oligomer may be about 5 wt % to about 20 wt % of a total amount of the resin composition.

In an embodiment, the resin composition may include a (meth)acrylate monomer containing a hydroxy group.

In an embodiment, the polymer may be formed by photocuring the resin composition photocured.

In an embodiment, a display device may include a display panel, a window disposed on the display panel, and an adhesive member disposed between the display panel and the window. The adhesive member may be derived from a resin composition containing a urethane (meth)acrylate oligomer. The resin composition may have a storage modulus of about $2\times10^3$ Pa to about $2\times10^4$ Pa when irradiated with 200 mJ/cm$^2$ of ultraviolet light. The resin composition may have a storage modulus of about $1\times10^4$ Pa to about $1\times10^5$ Pa when irradiated with 4000 mJ/cm$^2$ of ultraviolet light.

In an embodiment, the adhesive member may have a thickness of about 50 μm to about 200 μm.

In an embodiment, the display device may further include an input sensor disposed on the display panel. The adhesive member may be disposed between the display panel and the input sensor or between the input sensor and the window.

In an embodiment, the display panel may include a display element layer and an encapsulation layer disposed on the display element layer, the input sensor may be directly disposed on the encapsulation layer, and the adhesive member may be disposed on the input sensor.

In an embodiment, the display device may further include at least one folding area which has a radius of curvature of about 5 mm or less.

In an embodiment, the display device may further include a light control layer disposed between the adhesive member and the window, and an optical adhesive layer disposed between the light control layer and the window. The optical adhesive layer may include a polymer derived from the resin composition.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
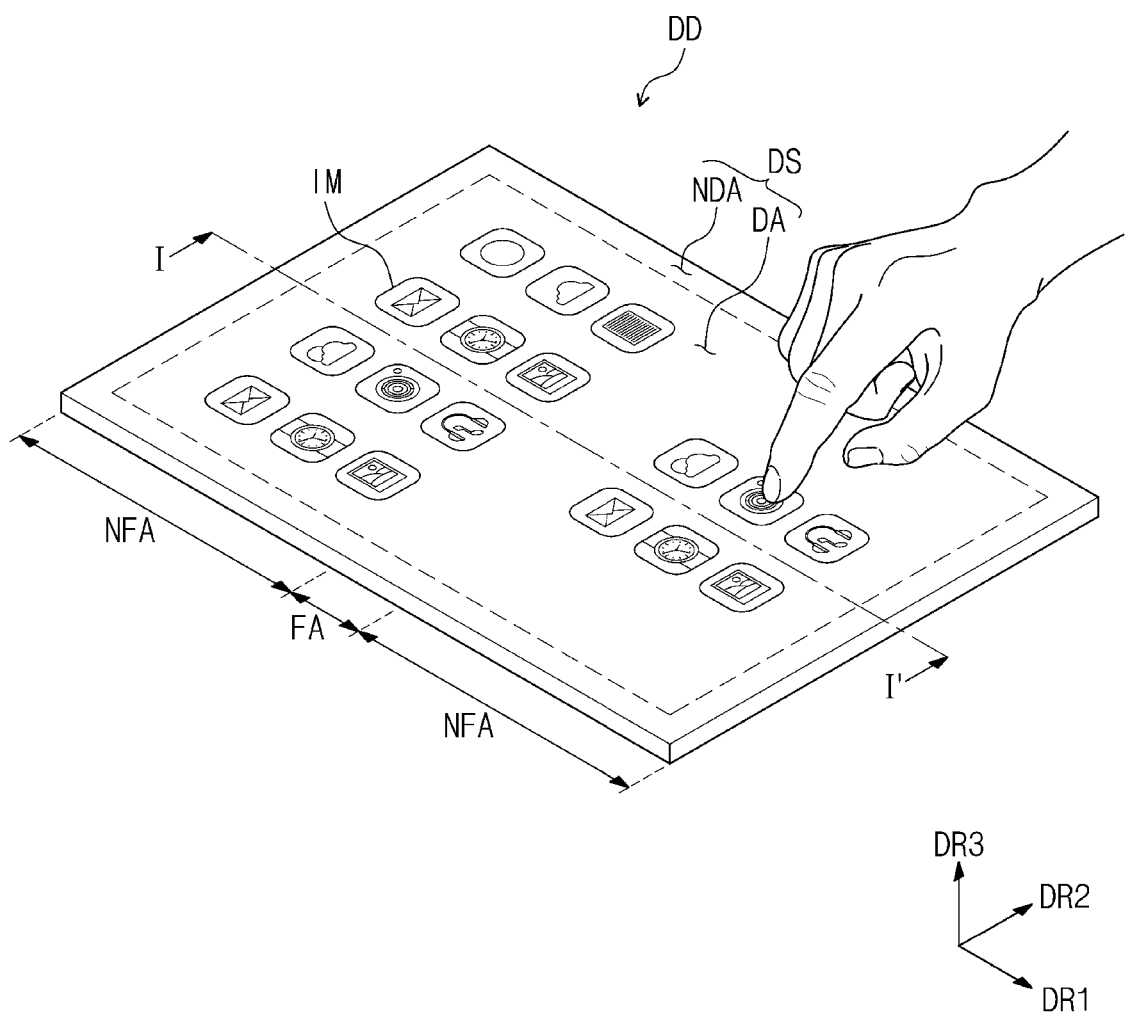
FIG. 1 is a schematic perspective view of a display device of an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the description, when an element (or a region, a layer, a portion, etc.) is referred to as being "on," "connected to," or "coupled to" another element, it means that the element may be directly disposed on/connected to/coupled to the other element, or that a third element may be disposed therebetween.

In the description, "directly disposed" may indicate that there is no layer, film, region, plate or the like added between a portion of a layer, a film, a region, a plate, or the like and other portions. For example, "directly disposed" may indicate disposing without additional members such as an adhesive member between two layers or two members.

Like reference numerals refer to like elements. Also, in the drawings, the thickness, the ratio, and the dimensions of elements are exaggerated for an effective description of technical contents.

The term "and/or," includes all combinations of one or more of which associated configurations may define.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of example embodiments. The terms of a singular form may include plural forms unless the context clearly indicates otherwise.

Terms such as "below," "lower," "above," "upper," and the like are used to describe the relationship of the configurations shown in the drawings. The terms are used as a relative concept and are described with reference to the direction indicated in the drawings. In the description, it should be understood that when an element is referred to as "disposed on," it may be as disposed "above" or "under" the other element.

Unless otherwise defined, all terms (including technical and scientific terms) used herein have the same meaning as commonly understood by one of ordinary skill in the art to which the embodiment pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

The phrase "in a plan view" means viewing the object from the top, and the phrase "in a schematic cross-sectional view" means viewing a cross-section of which the object is vertically cut from the side.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Hereinafter, a resin composition, an adhesive member, and a display device according to an embodiment will be described with reference to the accompanying drawings.

Figure 2:
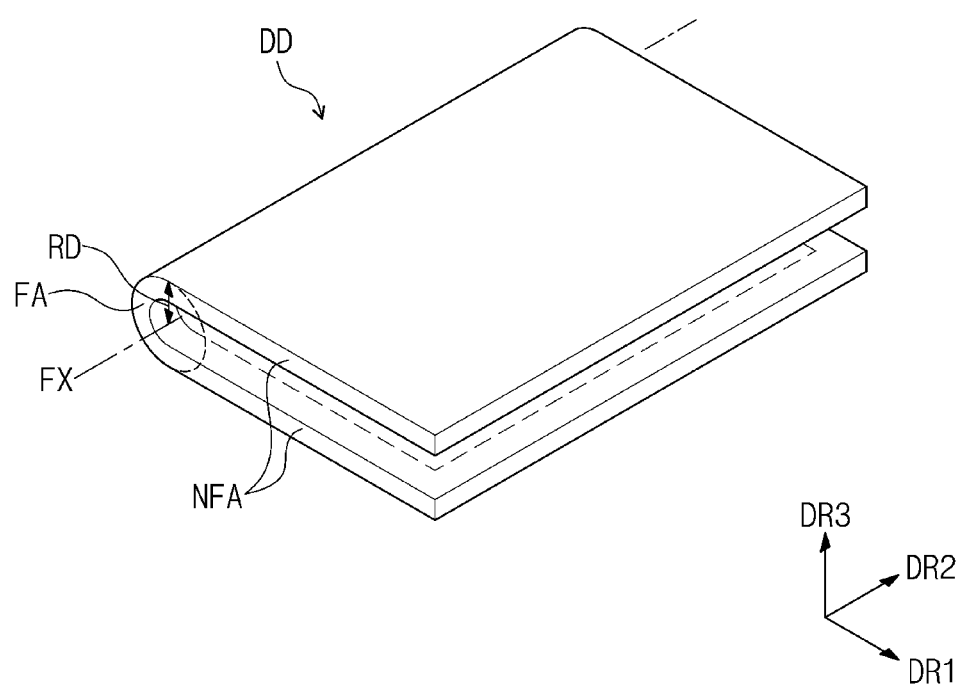
FIG. 2 is a schematic view illustrating the display device shown in FIG. 1 in a folded state.

FIG. 1 is a schematic perspective view of a display device according to an embodiment. FIG. 2 is a schematic view illustrating the display device shown in FIG. 1 in a folded state.

Referring to FIG. 1, a display device DD of an embodiment may have a rectangular shape which has long sides extending in a first direction DR1 and short sides extending in a second direction DR2 crossing the first direction DR1. However, the embodiment is not limited thereto. The display device DD may have various shapes such as circular and polygonal shapes. The display device DD may be a foldable display device.

In the display device DD according to an embodiment, a display surface DS on which an image IM is displayed may be parallel to a plane defined by the first direction DR1 and the second direction DR2. A normal direction of the display surface DS (or a thickness direction of the display device DD) is indicated by a third direction DR3. A front surface (or an upper surface) and a rear surface (or a lower surface) of respective members are defined by the third direction DR3. However, directions indicated by the first to third directions DR1, DR2, and DR3 are relative concepts, and may thus be changed to other directions. Hereinafter, first to third directions correspond to directions indicated by the first to third directions DR1, DR2, and DR3, respectively, and are given the same reference numerals.

The display device DD of an embodiment may include at least one folding area FA. Referring to FIGS. 1 and 2, the display device DD may include the folding area FA and non-folding areas NFA. The folding area FA may be disposed between the non-folding areas NFA, and the folding area FA and the non-folding areas NFA may be arranged adjacent to each other in the first direction DR1.

The folding area FA may be a portion deformable into a shape which is folded with respect to a folding axis FX extending in the second direction DR2. The folding area FA may have a radius of curvature RD of about 5 mm or less.

FIGS. 1 and 2, as an example, illustrate a folding area FA and two non-folding areas NFA, but the numbers of the folding area FA and the non-folding areas NFA are not limited thereto. For example, the display device DD may include more than two non-folding areas NFA, and folding areas FA disposed between the non-folding areas NFA.

In the display device DD of an embodiment, the non-folding areas NFA may be disposed to be symmetrical to each other with respect to the folding area FA. However, the embodiment is not limited thereto, and the folding area FA may be disposed between the non-folding areas NFA, but two non-folding areas NFA facing each other with respect to the folding area FA may be different in size.

The display surface DS of the display device DD may include a display area DA and a non-display area NDA around the display area DA. The display area DA may display images, and the non-display area NDA may not display images. The non-display area NDA may surround the display area DA, and define an edge of the display device DD.

Referring to FIG. 2, the display device DD may be a foldable display device DD which may be folded or unfolded. For example, the folding area FA may be folded along the folding axis FX, which is parallel to the second direction DR2, so that the display device DD may be folded. The folding axis FX may be defined as a minor axis parallel to the short sides of the display device DD.

When the display device DD is folded, the non-folding areas NFA may face each other, and the display device DD may be in-folded such that the display surface DS may not exposed to the outside. However, the embodiment is not limited thereto. Unlike the one illustrated in the drawing, the display device DD may be out-folded such that the display surface DS may be exposed to the outside.

Figure 3:
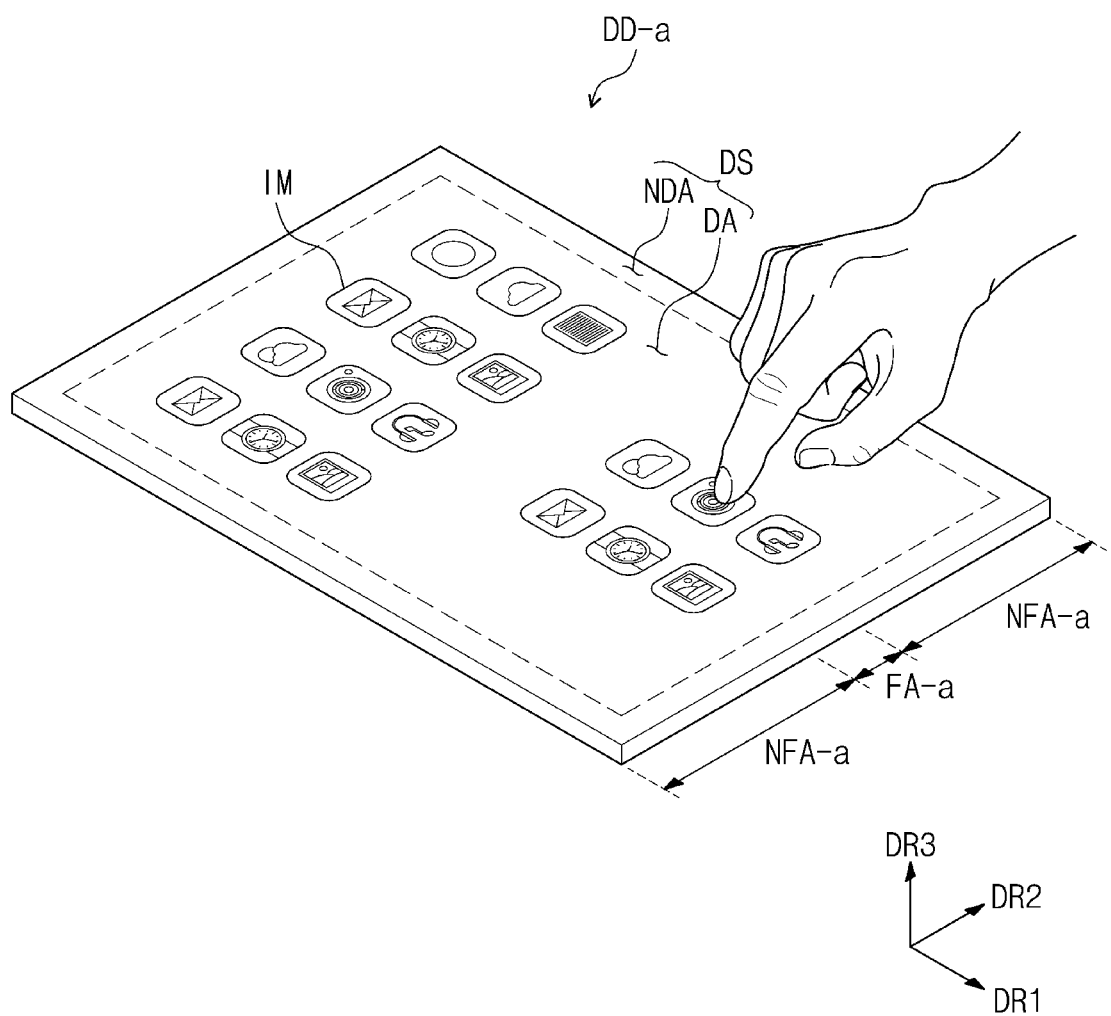
FIG. 3 is a schematic perspective view of a display device of an embodiment.
Figure 4:
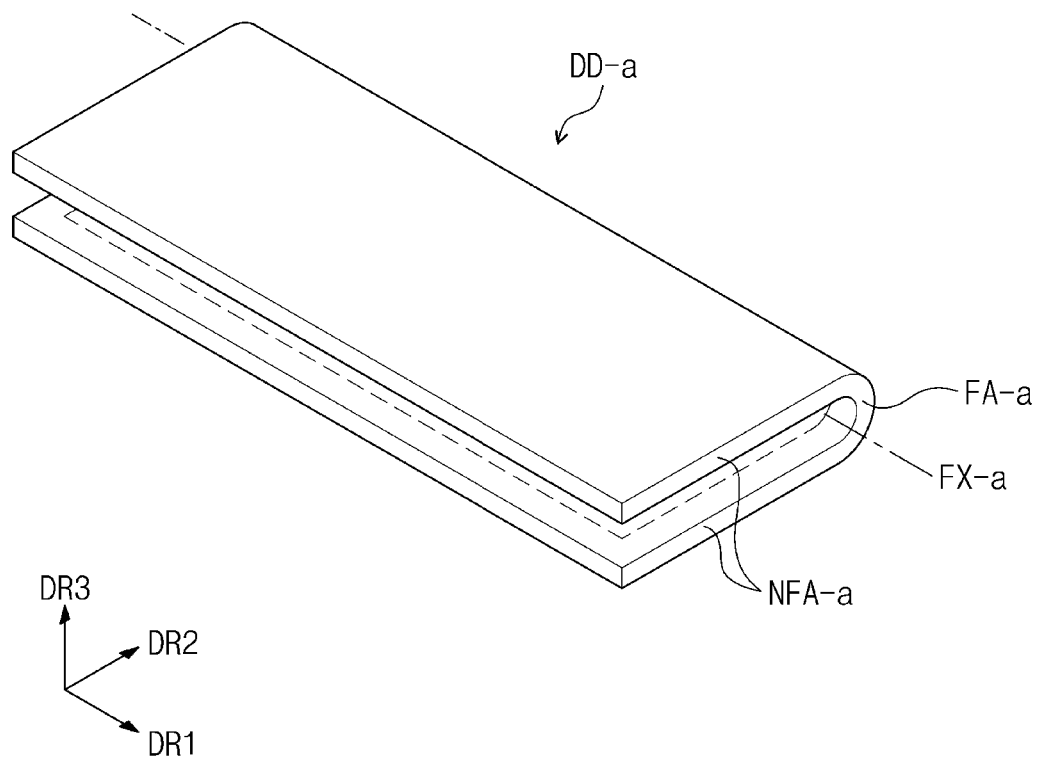
FIG. 4 is a schematic view illustrating the display device shown in FIG. 3 in a folded state.

FIG. 3 is a perspective view of a display device according to an embodiment. FIG. 4 is a view illustrating the display device shown in FIG. 3 in a folded state.

Except for the folding operation, a display device DD-a illustrated in FIG. 3 may substantially have an identical configuration to the display device DD illustrated in FIG. 1. Accordingly, for descriptions on the display device DD-a illustrated in FIGS. 3 and 4, the folding operation will be mainly described.

Referring to FIGS. 3 and 4, the display device DD-a may include a folding area FA-a and non-folding areas NFA-a. The folding area FA-a may be disposed between the non-folding areas NFA-a, and the folding area FA-a and the non-folding areas NFA-a may be arranged adjacent to each other in the second direction DR2.

The folding area FA-a is bent with respect to a folding axis FX-a which is parallel to the first direction DR1, and the display device DD-a may thus be folded. The folding axis FX-a may be defined as a major axis parallel to the long sides of the display device DD-a. The display device DD illustrated in FIG. 1 may be folded with respect to the minor axis, whereas the display device DD-a illustrated in FIG. 3 may be folded with respect to the major axis. FIG. 4 illustrates that the display device DD-a is in-folded such that the display surface DS is not exposed to the outside, but the embodiment is not limited thereto, and the display device DD-a may be out-folded with respect to the major axis.

Figure 5:
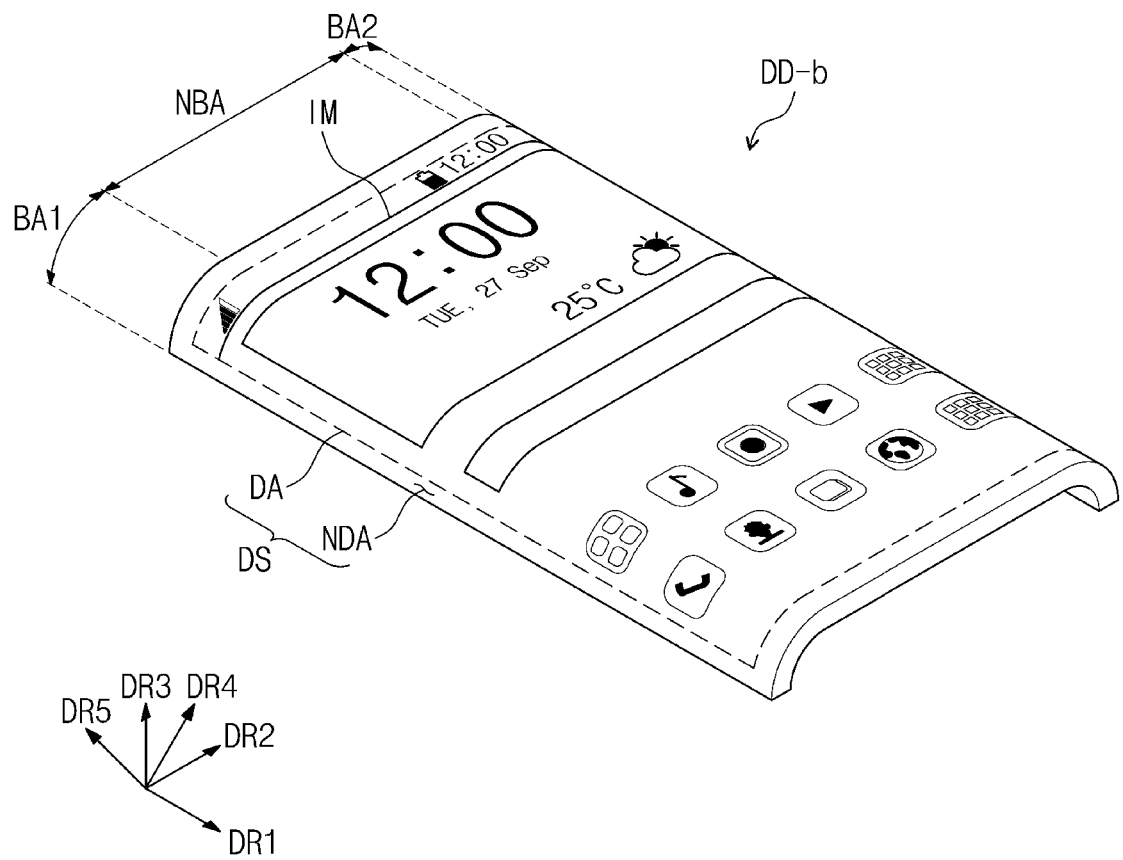
FIG. 5 is a schematic perspective view of a display device of an embodiment.

FIG. 5 is a schematic perspective view of a display device according to an embodiment. A display device DD-b of an embodiment may include bending areas BA1 and BA2 and a non-bending area NBA, and the bending areas BA1 and BA2 may be bent from one side of the non-bending area NBA.

Referring to FIG. 5, the display device DD-b of an embodiment may include the non-bending area NBA displaying an image IM on a front surface, and the first bending area BA1 and the second bending area BA2 which are displaying an image IM on a side surface. The first bending area BA1 and the second bending area BA2 each may be bent from both sides of the non-bending area NBA.

Referring to FIG. 5, the non-bending area NBA may provide an image IM in a direction of the third direction DR3 which is the front surface of the display device DD-b, and the first bending area BA1 and the second bending area BA2 may provide images in directions of a fifth direction DR5 and a fourth direction DR4, respectively. The fourth direction DR4 and the fifth direction DR5 may intersect the first to third directions DR1, DR2, and DR3. However, the directions indicated by the first to fifth directions DR1 to DR5 are relative concepts, and are not limited to the directional relationship illustrated in the drawings.

The display device DD-b of an embodiment may be a bending display device including a non-bending area NBA, and bending areas BA1 and BA2 each disposed on both sides of the non-bending area NBA. Although not illustrated, the display device of an embodiment may be a bending display device including one non-bending area and one bending area. The bending area may be provided and bent at only one side of the non-bending area.

FIGS. 1 to 5 described above illustrate a foldable display device, a bending display device, etc., but the embodiment is not limited thereto. The display device of an embodiment may be a rollable display device, a flat rigid display device, or a curved rigid display device.

Hereinafter, a display device of an embodiment will be described based on the display device DD which is folded with respect to the minor axis, but the embodiment is not limited thereto, and the following descriptions may be applied to other types of display devices such as the display device DD-a which is folded with respect to the major axis, and the display device DD-b which includes a bending area.

Figure 6:
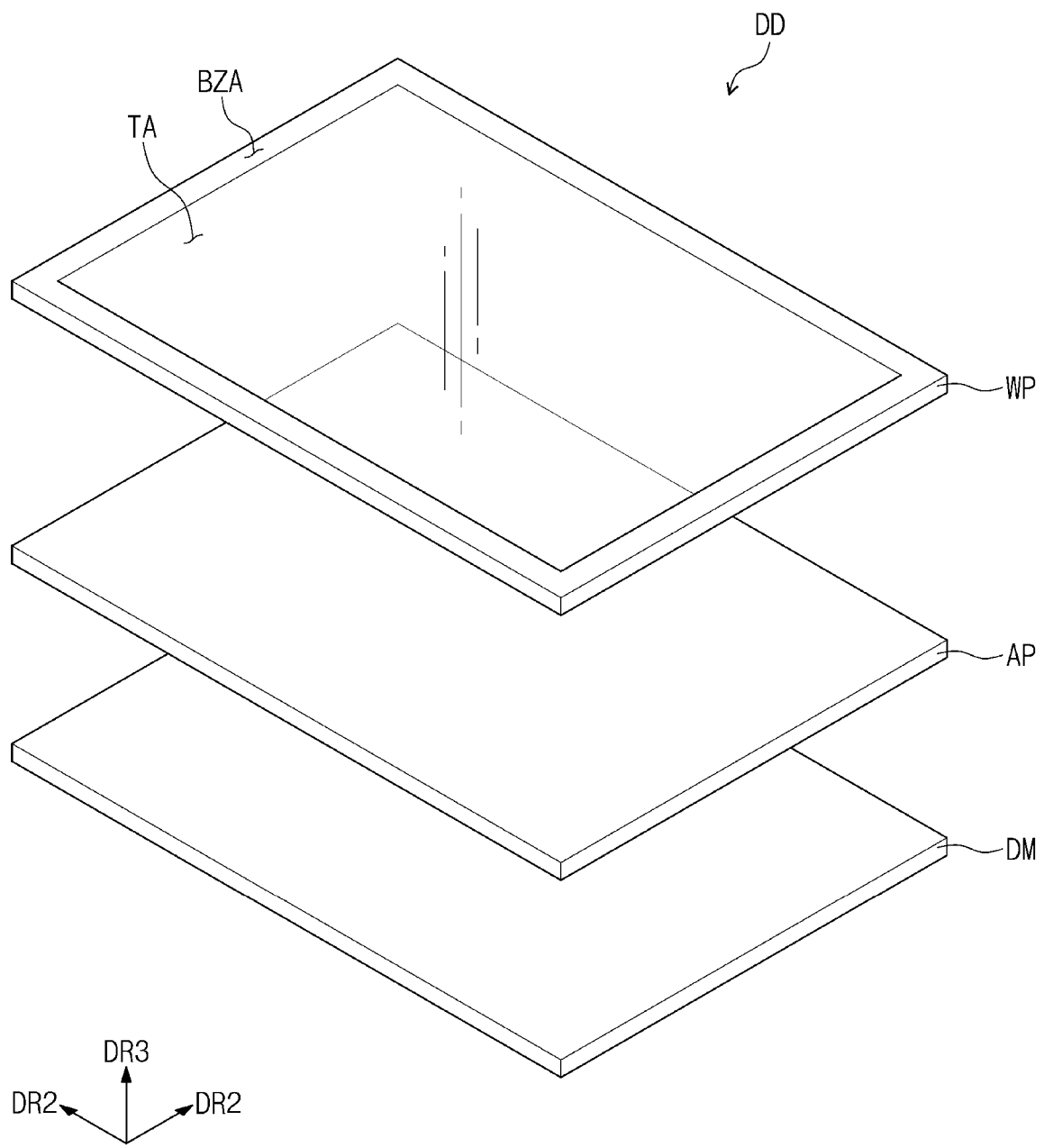
FIG. 6 is an exploded schematic perspective view of a display device of an embodiment.
Figure 7:
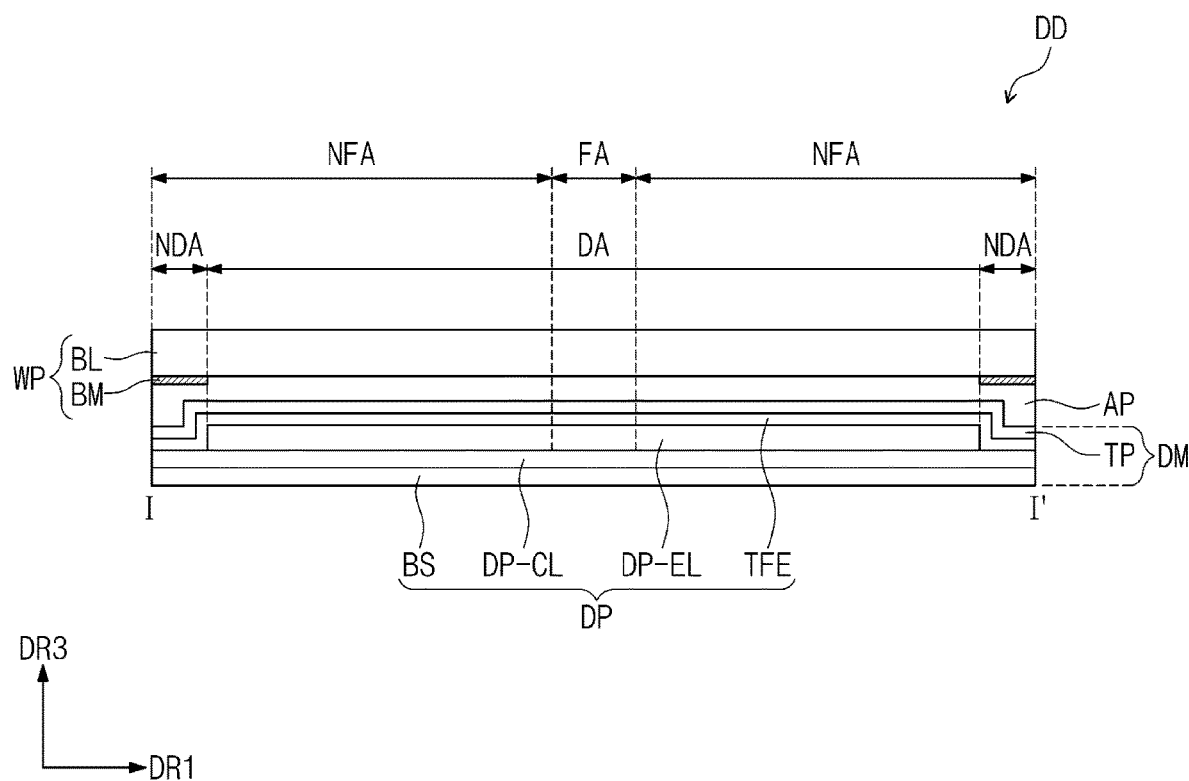
FIG. 7 is a schematic cross-sectional view of a display device of an embodiment.

FIG. 6 is an exploded schematic perspective view of a display device DD of an embodiment. FIG. 7 is a schematic cross-sectional view of a display device DD according to an embodiment. FIG. 7 is a schematic cross-sectional view of a portion corresponding to line I-I' of FIG. 1.

The display device DD of an embodiment may include a display module DM, and a window WP disposed on the display module DM. In the display device DD of an embodiment, the display module DM may include a display panel DP having a display element layer DP-EL, and an input sensor TP disposed on the display panel DP. The display device DD of an embodiment may include an adhesive member AP disposed between the display panel DP and the window WP. For example, in the display device DD of an embodiment, the adhesive member AP may be disposed between the input sensor TP and the window WP. The adhesive member AP may be an optically clear adhesive film (OCA) or an optically clear adhesive resin layer (OCR).

The adhesive member AP may be formed from a resin composition of an embodiment. The adhesive member AP may include a polymer derived from the resin composition of an embodiment.

The resin composition of an embodiment includes a urethane (meth)acrylate oligomer. In the description, (meth) acrylate refers to acrylate or methacrylate. The resin composition of an embodiment may include a urethane (meth) acrylate oligomer having a weight average molecular weight Mw of about 10,000 or greater. In the resin composition of an embodiment, the urethane (meth)acrylate oligomer may have a weight average molecular weight of about 27,000 to about 50,000.

In an embodiment, the urethane (meth)acrylate oligomer may include a photocurable compound containing at least one (meth)acryloyl group having a urethane bond. The urethane (meth)acrylate oligomer may include at least one of acrylate having a urethane bond, urethane acrylate having a polycarbonate skeleton, or urethane acrylate having a polyether skeleton. For example, the resin composition of an embodiment may include at least one of UV-3700B (Mitsubishi Chemical Holdings), UF-0051 (KYOEISHA CHEMICAL), OT-1524 (Dong-A Synthetic Chemical Co., Ltd.), or KRM9465 (DAICEL-ALLNEX) as a urethane acrylate oligomer.

The resin composition, containing a urethane (meth) acrylate oligomer having a weight average molecular weight of about 10,000 or greater, may exhibit low viscosity and may be applied through methods such as inkjet printing or dispensing coating. The urethane (meth)acrylate oligomer having a weight average molecular weight of about 10,000 or greater is included in the resin composition in an oligomer state having a relatively higher polymerization degree to maintain the high polymerization degree even after photocuring, and may thus exhibit low storage modulus (G') values and high peel strength properties.

The resin composition of an embodiment may contain a urethane (meth)acrylate oligomer in an amount of about 5 wt % to about 20 wt % with respect to the total 100 wt % of the resin composition. The resin composition of an embodiment includes the urethane (meth)acrylate oligomer having a weight average molecular weight of about 10,000 or greater in an amount of about 5 wt % to about 20 wt %, and thus exhibits a low viscosity of about 1.0 mPa·s to about 20 mPa s in a resin state, and has high adhesion and proper elasticity after photocuring, and accordingly, in case that the adhesive member formed of the resin composition of an embodiment is applied to a foldable display device, the display device may have improved folding properties.

The resin composition of an embodiment may further include a (meth)acrylate monomer containing a hydroxy group (—OH).

The resin composition of an embodiment may include 4-hydroxybutyl acrylate, 10-hydroxydecyl acrylate, and 6-hydroxyhexyl acrylate, or a mixture thereof as a (meth) acrylate monomer containing a hydroxy group.

The resin composition of an embodiment may include at least one photoinitiator. In case that the resin composition includes multiple photoinitiators, different photoinitiators may be activated by ultraviolet light ("UV") having different central wavelengths.

The photoinitiator may be any photoinitiator selected among 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, and 2-hydroxy-1-{4-[4-(2-hydroxy-2-methyl-propionyl)-benzyl]-phenyl}-2-methylpropan-1-one.

The photoinitiator may also be any photoinitiator selected among 2-methyl-1[4-(methylthio)phenyl]-2-morpholino-propan-1-one, 2-benzyl-2-dimethylamino-1-(4-morpholino-phenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetat), and bis(2,4-cyclopentadienyl)bis[2,6-difluoro-3-(1-pyrryl)phenyl] titanium(IV).

The resin composition of an embodiment may not contain a separate organic solvent. In other examples, the resin composition of an embodiment may contain an organic solvent, but the organic solvent may be contained in an amount of less than about 1 wt % with respect to the total 100 wt % of the resin composition. The resin composition of an embodiment may not contain an organic solvent, or may contain an organic solvent in an amount of less than about 1 wt %, thereby improving processability of the resin composition.

The resin composition of an embodiment may have a viscosity of about 20 mPa·s or less at about 30° C. to about 50° C. The resin composition of an embodiment may have a viscosity of about 1.0 mPa·s to about 20 mPa·s at about 30° C. to about 50° C. For example, the resin composition may have a viscosity of about 1.0 mPa·s to about 20 mPa·s at about 40° C. The viscosity of the resin composition was measured using a JIS Z8803 method.

When the resin composition of an embodiment has a viscosity of less than about 1.0 mPa·s, the viscosity is low to cause a flow of the resin composition liquid provided for forming an adhesive member, and accordingly, it may be difficult to form a coating film having a uniform thickness using the resin composition. When the resin composition of an embodiment has a viscosity of greater than about 20 mPa·s, it may be difficult for the resin composition to be discharged in an appropriate amount from an applicator used to apply the resin composition.

The resin composition of an embodiment may be photo-cured. For example, the resin composition of an embodiment may not be photo-cured.

For example, the resin composition may be photo-cured with UV irradiation. To be specific, the resin composition is irradiated with about 200 mJ/cm$^2$ of UV, and the resin composition may thus be pre-cured. The resin composition is irradiated with about 4000 mJ/cm$^2$ of UV, and the resin composition may thus be post-cured.

When the resin composition of an embodiment is irradiated with about 200 mJ/cm$^2$ of UV having a central peak of about 360 nm to about 400 nm, the resin composition has a storage modulus of about $2 \times 10^3$ Pa to about $2 \times 10^4$ Pa. The amount of UV may refer to the total amount of UV applied on an irradiated material. For example, when the resin composition is irradiated with about 200 mJ/cm$^2$ of UV, the total amount of UV applied on the resin composition may be about 200 mJ/cm$^2$.

When the resin composition is irradiated with about 200 mJ/cm$^2$ of UV, and thus the resin composition has a storage modulus of less than about $2 \times 10^3$ Pa, the resin composition has high fluidity, and may thus cause bonding failure. For example, after applying the resin composition onto a target substrate, the thickness of the resin composition may change due to pressure applied during bonding, or the target substrate may be contaminated due to leakage of the resin composition within a predetermined range of the target substrate.

When the resin composition is irradiated with about 200 mJ/cm$^2$ of UV, and thus the resin composition has a storage modulus of greater than about $2 \times 10^4$ Pa, the elastic modulus increases during the pre-curing process, and the contact between the target substrate and the resin composition may not be sufficient during bonding, and may thus cause bonding failure.

The resin composition of an embodiment has a storage modulus of about $2 \times 10^3$ Pa to about $2 \times 10^4$ Pa when irradiated with about 200 mJ/cm$^2$ of UV, and accordingly, the resin composition has a sufficient elastic modulus in the pre-cured state, and may thus maintain the thickness and shape on the target substrate.

When the resin composition of an embodiment is irradiated with about 4000 mJ/cm$^2$ of UV having a central peak of about 360 nm to about 400 nm, the resin composition has a storage modulus of $1 \times 10^4$ Pa to about $1 \times 10^5$ Pa.

When the resin composition is irradiated with about 4000 mJ/cm$^2$ of UV, and thus the resin composition may have a storage modulus of less than about $1 \times 10^4$ Pa, the resin composition may not exhibit sufficient adhesive strength after being cured. When the resin composition is irradiated with about 4000 mJ/cm$^2$ of UV, and thus the resin composition has a storage modulus of greater than about $1 \times 10^5$ Pa, the resin composition may not have flexible properties after being cured. Accordingly, a flexible display device including the adhesive member derived from the resin composition may have failure in operation such as folding, and have greater stress due to folding.

The resin composition of an embodiment has a storage modulus of about $1 \times 10^4$ Pa to about $1 \times 10^5$ Pa when irradiated with about 4000 mJ/cm$^2$ of UV, and thus has high adhesion and a proper elastic modulus, and accordingly, when the adhesive member formed of the resin composition of an embodiment is applied to a foldable display device, the display device may have improved folding properties.

The display panel DP may include a base substrate BS, a circuit layer DP-CL disposed on the base substrate BS, and a display element layer DP-EL disposed on the circuit layer DP-CL, and an encapsulation layer TFE covering the display element layer DP-EL. For example, the display panel DP may include a plurality of organic light emitting elements or a plurality of quantum dot light emitting elements in the display element layer DP-EL.

The configuration of the display panel DP shown in FIG. 7 is an example and the configuration of the display panel DP is not limited thereto. For example, the display panel DP may include a liquid crystal display element, and the encapsulation layer TFE may be omitted.

The input sensor TP may be disposed on the display panel DP. For example, the input sensor TP may be directly disposed on the encapsulation layer TFE of the display panel DP. The input sensor TP may detect and convert external inputs into input signals, and provide the input signals to the display panel DP. For example, in the display device DD of an embodiment, the input sensor TP may be a touch sensor detecting a touch. The input sensor TP may recognize a user's direct touch, a user's indirect touch, a direct touch of an object, or an indirect touch of an object. The input sensor TP may detect the location of a touch or the strength (pressure) of a touch applied from the outside. The input sensor TP in an embodiment may have various structures or be formed of various materials, and is not limited to any example. The input sensor TP may include sensing electrodes (not shown) for detecting external inputs. The sensing electrodes (not shown) may detect external inputs in a capacitive manner. The display panel DP may receive input signals from the input sensor TP and generate images corresponding to the input signals.

The window WP may protect the display panel DP and the input sensor TP. An image IM generated in the display panel DP may be provided to users by being transmitted through the window WP. The window WP may provide a touch surface of the display device DD. In the display device DD including a folding area FA, the window WP may be a flexible window.

The window WP may include a base layer BL and a printing layer BM. The window WP may include a transmission area TA and a bezel area BZA. A front surface of the window WP including the transmission area TA and the bezel area BZA may correspond to a front surface of the display device DD.

The transmission area TA may be an optically transparent area. The bezel area BZA may be an area having a relatively lower light transmittance than the transmission area TA. The bezel area BZA may have a color. The bezel area BZA may be adjacent to the transmission area TA and surround the transmission area TA. The bezel area BZA may define the shape of the transmission area TA. However, the embodiments are not limited thereto, and the bezel area BZA may be disposed adjacent to only one side of the transmission area TA, and a portion of the bezel area BZA may be omitted.

The base layer BL may be a glass or plastic substrate. For example, the base layer BL may be a tempered glass substrate. In another example, the base layer BL may be formed of a flexible polymer resin. For example, the base layer BL may be formed of polyimide, polyacrylate, polymethylmethacrylate, polycarbonate, polyethylenenaphthalate, polyvinylidene chloride, polyvinylidene difluoride, polystyrene, ethylene vinylalcohol copolymer, or combinations thereof. However, the embodiment is not limited thereto, and other base layer BL materials for the window WP may be used without limitation.

The printing layer BM may be disposed on a surface of the base layer BL. In an embodiment, the printing layer BM may be provided on a lower surface of the base layer BL adjacent to the display module DM. The printing layer BM may be disposed on an edge area of the base layer BL. The printing layer BM may be an ink printing layer. Further, the printing layer BM may be a layer formed by including a pigment or dye. In the window WP, the bezel area BZA may be a portion in which the printed layer BM is provided.

The window WP may further include at least one functional layer (not shown) provided on the base layer BL. For example, the functional layer (not shown) may be a hard coating layer, an anti-fingerprint coating layer, etc., but the embodiments are not limited thereto.

There may be a step between a portion of the base layer BL provided with the printing layer BM and a portion without the printing layer BM. The adhesive member AP of an embodiment formed from the resin composition described above may have low storage modulus and high adhesion values and thus may be bonded to the window WP without lifting at the step portion.

The adhesive member AP of an embodiment may include a polymer derived from the resin composition of an embodiment described above. The adhesive member AP of an embodiment may include a polymer derived from a resin composition containing a urethane (meth)acrylate oligomer having a weight average molecular weight of about 10,000 or greater. The adhesive member AP of an embodiment may include a polymer derived from a resin composition containing a urethane (meth)acrylate oligomer, a (meth)acrylate monomer having a hydroxy group, and a photoinitiator. The urethane (meth)acrylate oligomer, the (meth)acrylate monomer containing a hydroxy group, and the photoinitiator may have the same descriptions of the resin composition of an embodiment described above.

The resin composition before the polymerization reaction through the photoinitiator may have a viscosity of about 1.0 mPa·s to about 20 mPa·s at 30° C. to 50° C., as measured using a JIS Z8803 method. The resin composition has a storage modulus of about $2 \times 10^3$ Pa to about $2 \times 10^4$ Pa when irradiated with 200 mJ/cm$^2$ of UV, and has a storage modulus of about $1 \times 10^4$ Pa to about $1 \times 10^5$ Pa when irradiated with 4000 mJ/cm$^2$ of UV.

The adhesive member AP included in the display device DD of an embodiment may be provided on a surface of the window WP or a surface of the display module DM in a liquid resin composition state, and may be formed by UV-curing a liquid resin composition RC provided between the window WP and the display panel DP. In other examples, the adhesive member AP may be formed by UV-curing the liquid resin composition in a separate process, laminating a surface of the adhesive member AP in a cured state in the form of an adhesive film on a surface of the window WP or a surface of the display module DM, and attaching a surface of the window WP or a surface of the display module DM, which is unattached, to the other surface of the adhesive member AP.

The adhesive member AP may have a thickness of about 50 μm to about 200 μm. For example, the adhesive member AP may have a thickness of about 100 μm to about 150 μm.

Figure 8A:
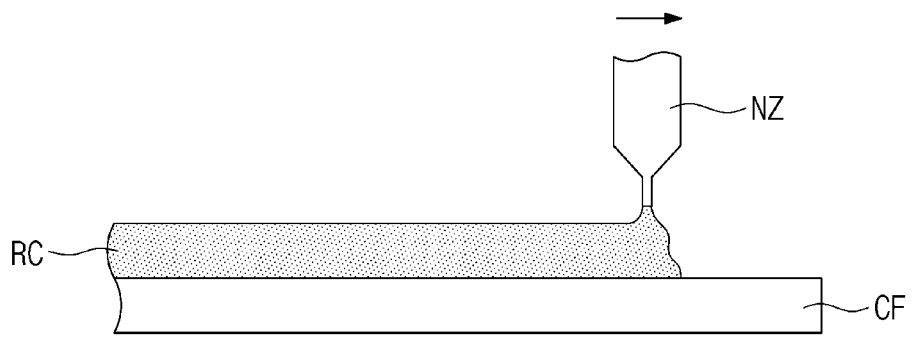
FIGS. 8A to 8C are schematic views illustrating a method for manufacturing an adhesive member of an embodiment.
Figure 8B:
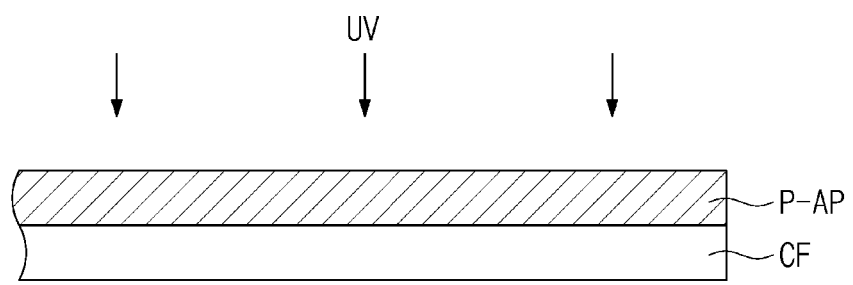
Figure 8C:
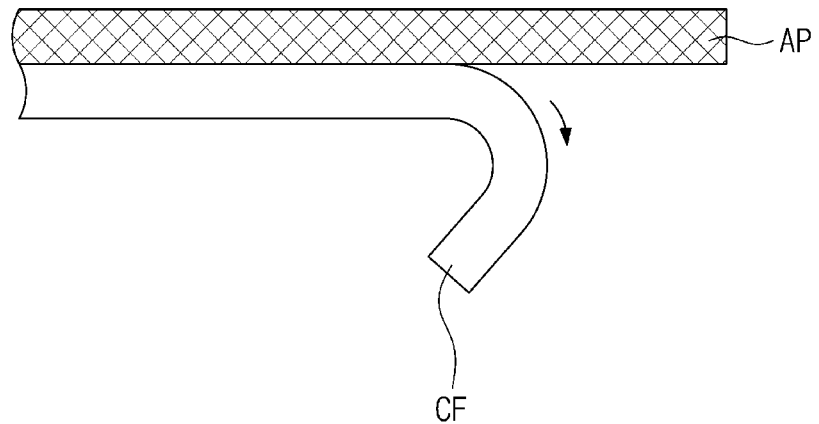

FIGS. 8A to 8C are views schematically illustrating preparing an adhesive member AP according to an embodiment. FIG. 8A illustrates providing a resin composition RC for forming an adhesive member AP, FIG. 8B illustrates UV irradiation, and FIG. 4C illustrates removing a carrier film CF.

Referring to FIGS. 8A to 8C, the resin composition RC may be provided on the carrier film CF. For example, a polyethylene terephthalate (PET) film may be used as the carrier film CF, but the embodiment is not limited thereto. The carrier film CF serves as a substrate for coating the liquid resin composition RC, and may be used without limitation as long as it is easily detached from the adhesive member AP after UV-curing. For example, release treatment may be performed on a surface of the carrier film CF provided with the resin composition RC.

The resin composition RC may be provided through methods such as an inkjet printing method or a dispensing method. The resin composition RC of an embodiment may be easily discharged from a nozzle NZ, etc. by having a viscosity value of about 1.0 mPa·s to about 20 mPa·s at about 30° C. to about 50° C., and may be provided to maintain a constant coating thickness. To be specific, the resin composition RC of an embodiment may have a viscosity value of about 1.0 mPa·s to about 20 mPa·s at 40° C.

A pre-adhesive member P-AP provided by coating the resin composition RC to a constant thickness may be irradiated with UV. FIG. 8B illustrates that the coated pre-adhesive member P-AP is directly irradiated with UV, but the embodiment is not limited thereto. An auxiliary carrier film (not shown) may be further disposed on the pre-adhesive member P-AP, and the auxiliary carrier film (not shown) may transmit UV and may cover the pre-adhesive member P-AP during the UV-curing process.

After the UV-curing is performed, an adhesive member AP may be formed. The adhesive member AP may finally be provided by removing the carrier film CF used in the process.

The adhesive member AP prepared in the steps of FIGS. 8A to 8C may be applied to the display device DD described above. For example, a surface of the adhesive member AP may be attached to the display module DM, and the window WP may be sequentially attached on the other surface of the adhesive member AP facing the surface of the adhesive member AP attached to the display module DM. In other examples, the adhesive member AP may be provided to the display device DD by attaching a surface of the adhesive member AP on a surface of the window WP to face the display module DM, and attaching the other surface of the adhesive member AP facing a surface of the adhesive member AP attached to the window WP to the display module DM.

Figure 9A:
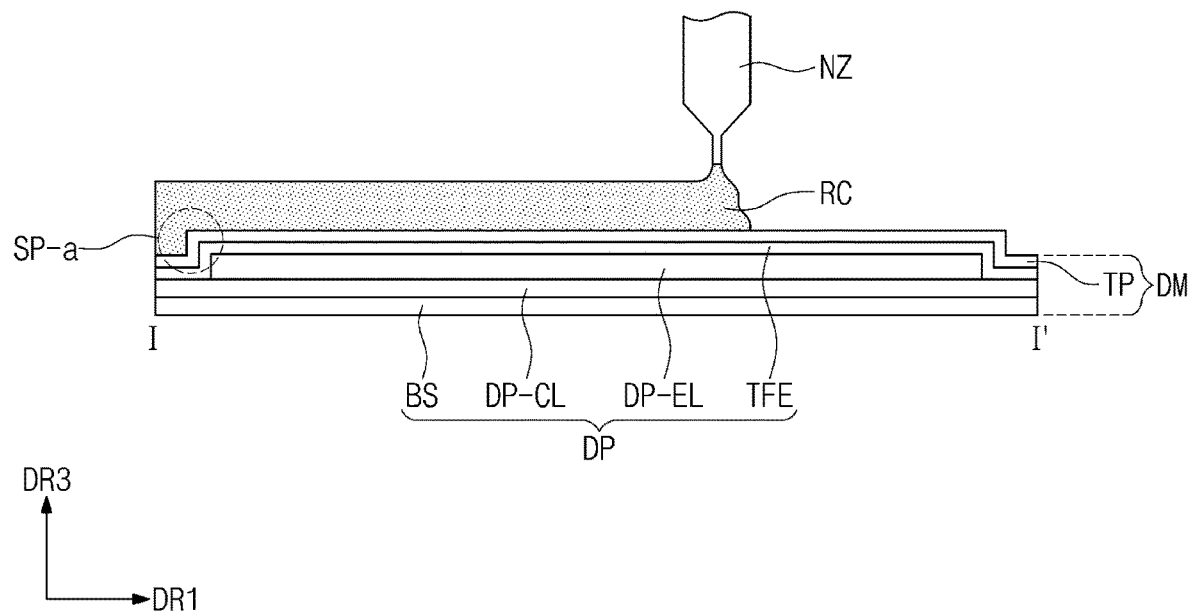
FIGS. 9A to 9B are schematic views illustrating a method for manufacturing an adhesive member of an embodiment.
Figure 9B:
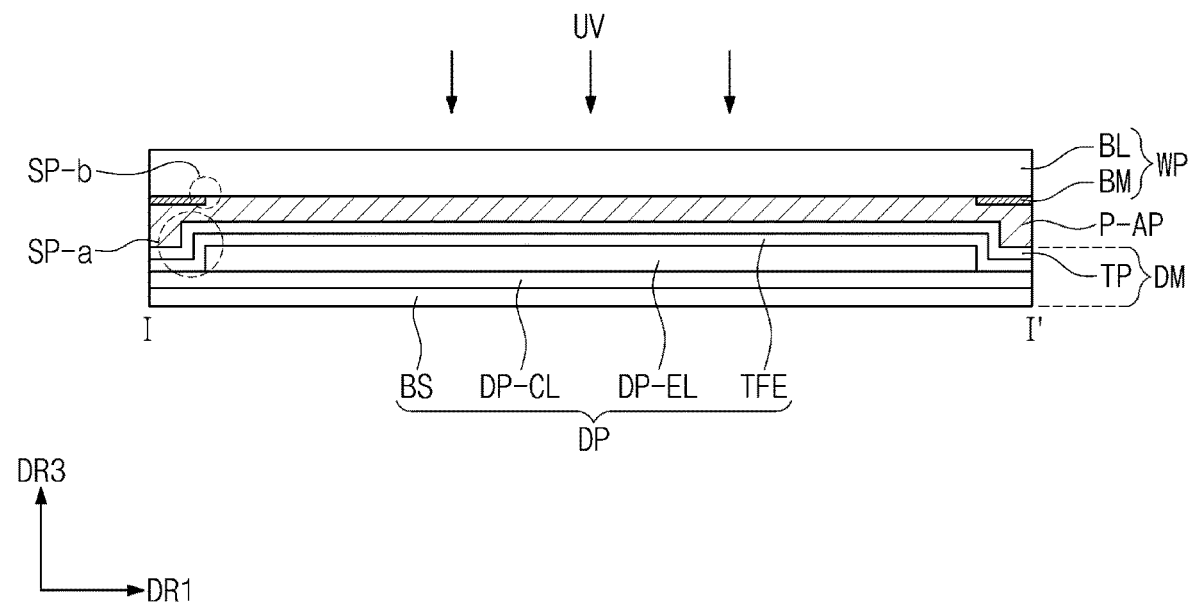

The resin composition provided in a liquid state between the display module DM and the window WP may be cured to form an adhesive member AP. FIGS. 9A and 9B illustrate preparing an adhesive member AP included in the display device DD through a method different from the method for preparing the adhesive member AP described with reference to FIGS. 8A to 8C.

FIG. 9A illustrates providing a resin composition RC on a display module DM. FIG. 9B illustrates irradiating a pre-adhesive member P-AP formed from a resin composition RC with UV.

The resin composition RC may be provided through methods such as an inkjet printing method or a dispensing method. The resin composition RC of an embodiment may be easily discharged from a nozzle NZ, etc. by having a viscosity value of about 1.0 mPa·s to about 20 mPa·s at 25° C., and may be provided to maintain a thin, constant coating thickness. The resin composition has a viscosity value of about 1.0 mPa·s to about 20 mPa·s, and may thus be provided while covering a curved portion of a step portion SP-a of the display module DM. The resin composition RC has a viscosity value of 20 mPa·s or less, and may fill (without leaving a space) the curved portion such as the step portion SP-a. The resin composition RC provided through the nozzle NZ has a viscosity value of 1.0 mPa·s or greater to be uniformly coated to a predetermined thickness without flowing out of the display module DM.

The window WP may be provided on the pre-adhesive member P-AP provided by coating the resin composition RC to a constant thickness. UV for curing the resin composition RC may be provided through the window WP. In case that the window WP is provided on the pre-adhesive member P-AP, the resin composition RC may be filled without an empty space in a step portion SP-b. The resin composition RC has a low viscosity value of 20 mPa·s or less, thereby covering the curve shape at a curved portion such as the step portion SP-a between the base layer BL and the printing layer BM to provide the pre-adhesive member P-AP. The pre-adhesive member P-AP may be cured after polymerization through the provided UV to form an adhesive member AP.

In other examples, different from FIG. 9B, before the window WP is provided on the pre-adhesive member P-AP, UV is provided to the pre-adhesive member P-AP to polymerize the resin composition RC. The amount of UV irradiation may be an amount of light that serves to fully cure the resin composition RC. The final adhesive member AP may be formed by partially polymerizing the resin composition RC in the pre-adhesive member P-AP state, and further reacting an unreacted resin composition RC after covering the window WP.

The display devices DD and DD-b according to an embodiment shown in FIGS. 1 to 5 include an adhesive member AP including a polymer derived from the resin composition of an embodiment to maintain the adhesive state of the window WP and the display panel DP, using the adhesive member AP, even in the folded state or the bending area, without lifting of the adhesive member AP.

Figure 10:
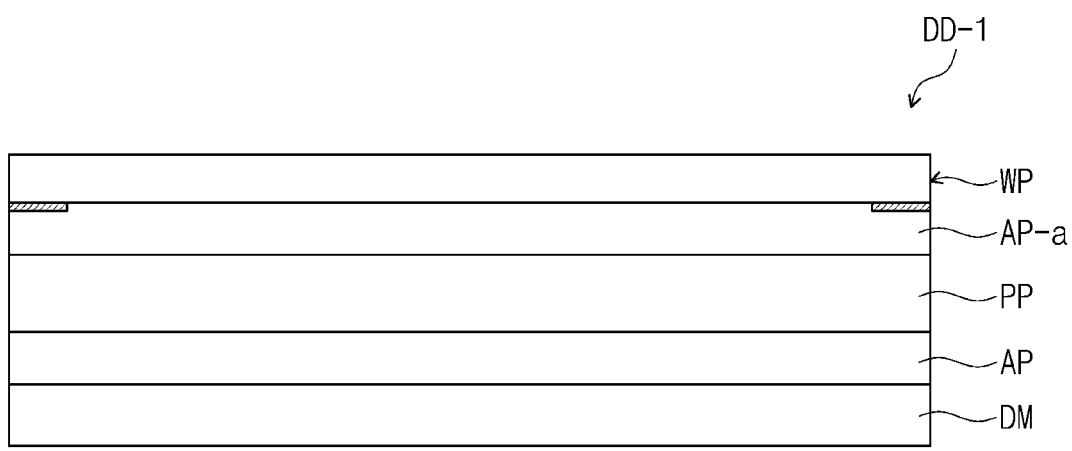
FIG. 10 is a schematic cross-sectional view of a display device of an embodiment.

FIG. 10 is a cross-sectional view illustrating a display device according to an embodiment. In the description of FIG. 10, features described previously in FIGS. 1 to 9B will not be repeated, and the descriptions will focus on the different features.

Compared with the display device DD described with reference to FIGS. 6 and 7, the display device DD-1 of an embodiment shown in FIG. 10 may further include a light control layer PP and an optical adhesive layer AP-a. The display device DD-1 of an embodiment may further include a light control layer PP disposed between the adhesive member AP and the window WP, and an optical adhesive layer AP-a disposed between the light control layer PP and the window WP.

The light control layer PP may be disposed on the display panel DP to control reflected external light in the display panel DP. The light control layer PP may include, for example, a polarizing layer or a color filter layer.

The optical adhesive layer AP-a may be an optically clear adhesive film (OCA) or an optically clear adhesive resin layer (OCR). The optical adhesive layer AP-a may be formed from the same or substantially similar resin composition of an embodiment as the adhesive member AP (refer to FIG. 7) described above. The optical adhesive layer AP-a may include a polymer derived from a resin composition including a urethane (meth)acrylate oligomer having a weight average molecular weight of about 27,000 to about 50,000, a (meth)acrylate monomer containing a hydroxy group, and at least one photoinitiator.

The resin composition before the reaction through the photoinitiator may have substantially the same properties as the resin composition RC described above in FIGS. 8A and 9A. Accordingly, the optical adhesive layer AP-a of an embodiment may exhibit high adhesion and a proper elastic modulus.

The display device DD-1 of an embodiment includes an optical adhesive layer AP-a and an adhesive member AP formed from the resin composition of an embodiment, and the optical adhesive layer AP-a and the adhesive member AP have high adhesion and a proper elastic modulus, thereby preventing lifting at an interface of the optical adhesive layer AP-a and the adhesive member AP even when the display device DD-1 is folded or bent, thereby exhibiting reliability.

Figure 11:
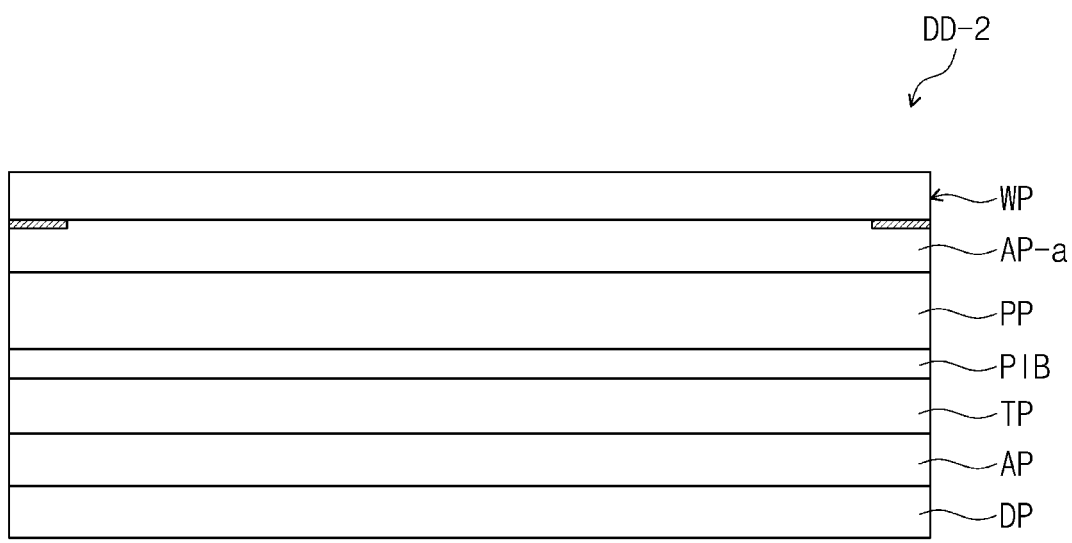
FIG. 11 is a schematic cross-sectional view of a display device of an embodiment.

FIG. 11 is a cross-sectional view illustrating a display device according to an embodiment. Hereinafter, in the description of the display device of an embodiment illustrated in FIG. 11, substantially similar features previously described with reference to FIGS. 1 to 10 will not be repeated, and the descriptions will focus on the different features.

Compared to the display device DD described with reference to FIGS. 6 and 7, a display device DD-2 according to an embodiment shown in FIG. 11 may further include a light control layer PP, an optical adhesive layer AP-a, and an interlayer adhesive layer PIB. As in the display device DD-1, illustrated in FIG. 10, the display device DD-2 of an embodiment may include a light control layer PP disposed between the adhesive member AP and the window WP, and an optical adhesive layer AP-a disposed between the light control layer PP and the window WP.

In the display device DD-2 according to an embodiment, the adhesive member AP may be provided between the display panel DP and the input sensor TP. The input sensor TP may not be directly disposed on the display panel DP, and the display panel DP and the input sensor TP may be bonded to each other through the adhesive member AP. For example, the adhesive member AP may be disposed between the encapsulation layer TFE (refer to FIG. 7) of the display panel DP and the input sensor TP.

The interlayer adhesive layer PIB may be provided below the light control layer PP. The interlayer adhesive layer PIB may be disposed between the input sensor TP and the light control layer PP, and may be formed of an adhesive material having anti-moisture permeation properties. For example, the interlayer adhesive layer PIB may be formed including polyisobutylene. The interlayer adhesive layer PIB may be disposed on the input sensor TP to prevent corrosion of the sensing electrodes of the input sensor TP.

The display device DD-2 of an embodiment includes an optical adhesive layer AP-a and an adhesive member AP formed from the resin composition of an embodiment, and the optical adhesive layer AP-a and the adhesive member AP may have high adhesion and a proper elastic modulus, thereby preventing lifting at an interface of the optical adhesive layer AP-a and the adhesive member AP even when the display device DD-2 is folded or bent, thereby exhibiting suitable reliability.

Hereinafter, with reference to Examples and Comparative Examples, a resin composition, an adhesive member, and a display device of an embodiment will be described. Examples shown below are illustrated only for the understanding of the embodiments and the scope is not limited thereto.

EXAMPLES

1. Preparation of Curable Liquid Resin Compositions

The resin compositions of Examples were prepared at the blending ratios listed in Table 1. The resin compositions of Comparative Examples were prepared at the blending ratios listed in Table 2.

After providing constituent materials of Examples and Comparative Examples to a heat-resistant, light-shielding container in the weight ratios disclosed in Tables 1 and 2, 2,4,6-trimethylbenzoyl-diphenylphosphine oxide, 2,4,6-trimethylbenzoyl-diphenylphosphine oxide (omnirad TPO-H) was provided in an amount of 2 wt % with respect to the total 100 wt % of the resin composition. Thereafter, the provided materials were stirred at 100 rpm for one hour using a three one motor (Shinto Scientific Co., Ltd.) at room temperature to prepare curable liquid resin compositions.

TABLE 1

| Material | Example 1 | Example 2 | Example 3 | Example 4 | Example 5 | Example 6 | Example 7 | Example 8 | Example 9 |
|---|---|---|---|---|---|---|---|---|---|
| UV-3700B | 5 | 5 | 6 | 6 | | | | | |
| UF-C051 | | | | | 2 | | 15 | 10 | 10 |
| OT-1524 | | | | | 13 | 14 | | | |
| KRM9465 | | | | | 5 | 5 | | | |
| UC-102M | | | | | | | | | 2 |
| 4-HBA | | | 2 | 2 | | | 24 | 35 | 15 |
| SYA-4 | 53 | | 47 | | | | | | |
| SYA-6 | | 53 | | 47 | 43 | 44 | | | |
| MEDOL-10 | | | | | | | | | 15 |
| 2-EHA | | | | | | | 47 | 30 | |
|  | | | | | 36 | 37 | | 25 | |
|  | 42 | 42 | 45 | 45 | | | 14 | | 58 |

TABLE 2

| Material | Comparative Example 1 | Comparative Example 2 | Comparative Example 3 | Comparative Example 4 |
|---|---|---|---|---|
| UV-3700B | 5 | 5 | | 21 |
| UF-C051 | | | 10 | |
| OT-1524 | | | | |
| KRM9465 | | | | |
| UC-102M | | | | |
| 4-HBA | 53 | 23 | 15 | |
| SYA-4 | | | | |
| SYA-6 | | | | 79 |
| MEDOL-10 | | | | |
| 2-EHA | | | 40 | |
| EHDG-AT | | | 35 | |
| IDAA | 42 | 72 | | |

<Data on Materials Used as Components of Examples and Comparative Examples>

Data on materials used in Examples and Comparative Examples disclosed in Tables 1 and 2 are as follows.

UV-3700B: Mitsubishi Chemical Co., Ltd., Urethane acrylate
UF-0051: Kyoeisha Chemical Co., Ltd., Urethane acrylate
OT-1524: Dong-A Synthetic Chemical Co., Ltd., Urethane acrylate
KRM9465: Daicel Allnex Co., Ltd., Urethane acrylate
UC-102M: Kuraray Co., Ltd., Polyisoprene methacrylate
4-HBA: Osaka Organic Chemical Industry Co., Ltd., 4-hydroxybutyl acrylate
SYA004: Sanyu Chemical Co., Ltd., 10-Hydroxydecyl acrylate
SYA006: Sanyu Chemical Co., Ltd., 6-hydroxyhexyl acrylate
MEDOL-10: Osaka Organic Chemical Industry Co., Ltd., (2-methyl-2-ethyl-1,3-dioxolan-4-yl)methylacrylate
2-EHA: Tokyo Chemical Industry Co., Ltd., 2-ethylhexyl acrylate
EHDG-AT: Kyoeisha Chemical Co., Ltd., 2-ethylhexyl-diglycolacrylate
IDAA: Osaka Organic Chemical Industry Co., Ltd., isodecyl acrylate 2. Evaluation of physical properties of resin compositions and adhesive members formed from the resin compositions In Tables 3 and 4 below, the viscosity of the resin compositions having the composition ratios of Tables 1 and 2, the storage modulus of the adhesive members formed from the resin compositions, bending reliability, with/without test pieces, and peel strength were measured. The viscosity of the resin compositions, the storage modulus of the adhesive members, the bending reliability, with/without test pieces, and the peel strength were measured through the following method. In Table 3, the measurement results of the resin compositions of Examples of Table 1 are given. In Table 4, the measurement results of the resin compositions of Comparative Examples of Table 2 are given.

[Method of Viscosity Measurement]

The viscosity of the resin compositions were measured at 40° C. using the JIS Z8803 method, and were measured at 10 rpm using a viscometer TVE-25L (TOKI SANGYO).

[Measurement of Storage Modulus]

The storage modulus was measured through a JIS K7244-7 method using a rotational rheometer (Anton-Paar, MCR302).

Measuring frequency: 1 Hz
Measuring temperature 25° C.

Using a UV LED having a peak at 385 nm, the resin compositions were irradiated with 200 $mJ/cm^2$ of UV. The measured storage modulus is indicated as G'200 $mJ/cm^2$ in Table 3.

Using a UV LED having a peak at 385 nm, the resin compositions were irradiated with 4000 $mJ/cm^2$ of UV. The measured storage modulus is indicated as G'4000 $mJ/cm^2$ in Table 3.

[Preparation of Bending Reliability Test Pieces]

0.6 mL of the curable liquid resin composition blended onto a PET film (Toyobo Co, Ltd., A4100 100 μm) was added dropwise, and spread uniformly using a #150 wire bar. Using a UV LED lamp having a peak at 365 nm, the PET film coated with the curable liquid resin composition was irradiated with 150 $mJ/cm^2$ of UV. The PET film irradiated with UV and another PET film (Toyobo Co, Ltd., A4100, 100 μm) were bonded together using a 2 kg-load hand roller. In the bonded state, the resin compositions were cured with a total of 4000 $mJ/cm^2$ of UV irradiation using a metal halide lamp (Eye Graphics Co., Ltd., a conveyor type UV irradiation device) on the side of the bonded PET film to obtain samples cut into 50 mm in width and 200 mm in length.

[Method of Bending Reliability Tests]

The samples obtained above were repeatedly bent at 23° C., and a bending diameter of 3 mm using a durability tester (Yuasa System Co., Ltd., a U-shape folding test machine) and bent 30,000 times. After the test, the test pieces were visually observed to check the presence/absence of peeling, lifting, displacement, and buckling, and the absence of peeling, lifting, displacement, and buckling was classified as "pass," and the presence of peeling, lifting, displacement, and buckling was classified as "fail."

[Preparation of Peel Test Pieces]

0.6 mL of the curable liquid resin composition blended onto slide glass (Matsunami Glass Ind., Ltd, slide glass 51112) was added dropwise, and spread uniformly using a

150 wire bar. A total of 200 mJ/cm2 of UV irradiation was applied to the slide glass to which the curable liquid resin composition was applied, using a UV LED lamp having a peak at 385 nm. The UV-irradiated slide glass and the PET film (Toyobo Co, Ltd., A4100, 100 μm) were bonded together using a 2 kg-load hand roller. In the bonded state, the resin compositions were cured with a total of 4000 mJ/cm$^2$ of UV irradiation using a metal halide lamp (Eye Graphics Co., Ltd., a conveyor type UV irradiation device) on the side of the PET film.

After visually checking whether the resin composition flowed out during the bonding, the results were marked as 0 or X under the following conditions.

O: The bonding was performed without the leakage of the resin composition.

X: Resin composition leaked out

[Measurement of peel strength]

Peel strength was measured with a universal material tester (Instron, type 5965) such that the prepared test pieces obtained above had a peel angle of 180° at a rate of 300 mm. The peel strength was taken as the average value of about 50 mm peeling. Pass or fail is indicated under the following conditions.

Pass: Greater than 1 kg/25 mm
Fail: Less than 1 kg/25 mm

The resin compositions of Examples 1 to 9 exhibited peel strength with a peel strength of about 1 kg/25 mm or greater.

TABLE 4

| Evaluation item | Comparative Example 1 | Comparative Example 2 | Comparative Example 3 | Comparative Example 4 |
|---|---|---|---|---|
| Viscosity | 11 | 7 | 16 | 68 |
| G'200 mJ/cm$^2$ | 1.2 × 10$^4$ | 1.9 × 10$^3$ | 1.0 × 10$^3$ | |
| G'4000 mJ/cm$^2$ | 1.1 × 10$^5$ | 1.5 × 10$^4$ | 1.3 × 10$^4$ | |
| Bending reliability test | Fail | Fail | | |
| Preparation of peel test pieces | O: | X | X | |
| Peel strength | 1.9 | 0.3 | 0.6 | |

Referring to the results of Table 4, it is seen that Comparative Examples 1 to 3 have a low viscosity of about 16 mPa·s or less in the resin composition state. Comparative Example 4 has a viscosity of about 68 mPa·s in the resin composition state, and it is seen that Comparative Example 4 has a relatively higher viscosity than Comparative Examples 1 to 3. The resin composition of Comparative Example 4 had a high viscosity to prevent preparation and evaluation of samples. The resin compositions of Comparative Examples 1 to 3 used a urethane (meth)acrylate oli-

TABLE 3

| Evaluation item | Example 1 | Example 2 | Example 3 | Example 4 | Example 5 | Example 6 | Example 7 | Example 8 | Example 9 |
|---|---|---|---|---|---|---|---|---|---|
| Viscosity (mPa · s) | 15 | 12 | 14 | 11 | 20 | 15 | 18 | 20 | 14 |
| G'200 mJ/cm$^2$ | 3.0 × 10$^3$ | 2.5 × 10$^3$ | 5.0 × 10$^3$ | 4.0 × 10$^3$ | 1.8 × 10$^3$ | 1.4 × 10$^4$ | 2.0 × 10$^3$ | 8.5 × 10$^3$ | 3.7 × 10$^3$ |
| G'4000 mJ/cm$^2$ | 2.5 × 10$^4$ | 4.9 × 10$^4$ | 2.8 × 10$^4$ | 4.6 × 10$^4$ | 6.0 × 10$^4$ | 3.9 × 10$^4$ | 2.7 × 10$^4$ | 3.7 × 10$^4$ | 2.8 × 10$^4$ |
| Bending reliability test | Pass | Pass | Pass | Pass | Pass | Pass | Pass | Pass | Pass |
| With/without peel test pieces | O: | O: | O: | O: | O: | O: | O: | O: | O: |
| Peel strength (kg/25 mm) | 1.1 | 1.4 | 1.2 | 1.4 | 2.0 | 1.9 | 3.8 | 2.0 | 2.1 |

Referring to the results of Table 3, it is seen that Examples 1 to 9 have a low viscosity of about 20 mPa·s or less in the resin composition state. The resin compositions of Examples 1 to 4 have low viscosity properties and may thus be used to form a thin uniform coating film. The resin compositions of Examples 1 to 9 used a urethane (meth)acrylate oligomer in an amount of about 5 wt % to about 20 wt %, and further included a (meth)acrylate monomer containing a hydroxy group.

Including the above material combinations, the resin compositions of Examples 1 to 9 have a storage modulus of about 2×10$^3$ Pa to about 2×10$^4$ Pa when irradiated with about 200 mJ/cm$^2$ of UV, and have a storage modulus of about 1×10$^4$ Pa to about 1×10$^5$ Pa when irradiated with about 4000 mJ/cm$^2$ of UV.

The resin compositions of Examples 1 to 9 have the above numerical range according to the total amount of UV irradiation, and may thus have sufficient adhesion in the pre-cured state of the resin composition and have desirable elasticity in the post-cured state.

Accordingly, for the resin compositions of Examples, defects such as peeling, lifting, displacement, and buckling may not be caused in the bending reliability test. Bonding the resin compositions of Examples was successfully performed without the leakage of the resin compositions during the bonding process in the preparation of the test pieces.

gomer in an amount of about 5 wt % to about 20 wt %. The resin composition of Example 4 contained a urethane (meth)acrylate oligomer in an amount of about 21 wt %.

The resin composition of Comparative Example 1 contained a large amount of 4-HBA compared to the resin compositions of Examples. The resin composition of Comparative Example 2 contained a large amount of IDAA compared to the resin compositions of Examples.

Including the above material combinations, the resin composition of Comparative Example 1 has a storage modulus of about greater than about 1×10$^5$ when irradiated with about 4000 mJ/cm$^2$ of UV, the resin composition of Comparative Example 2 has a storage modulus of less than about 2×10$^3$ Pa when irradiated with about 200 mJ/cm$^2$ of UV, and the resin composition of Comparative Example 3 has a storage modulus of less than about 2×10$^3$ Pa when irradiated with about 200 mJ/cm$^2$ of UV. The resin compositions of Comparative Examples 1 to 3 have values different from the numerical range of the storage modulus of the resin compositions of Examples 1 to 9 of the embodiments.

Accordingly, in the resin compositions of Comparative Examples, defects such as peeling, lifting, displacement, and buckling were caused in the bending reliability test, or the resin compositions leaked out during the bonding in the preparation of the test pieces, or the resin compositions had low peel strength with a peel strength of less than about 1 kg/25 mm.

Referring to Table 3 and Table 4 together, the resin compositions of Examples 1 to 9 satisfy a value of about $2\times10^3$ Pa to about $2\times10^4$ Pa when irradiated with about 200 mJ/cm$^2$ of UV to exhibit sufficient adhesion in the pre-curing, and maintain a proper thickness during the bonding, thereby preventing contamination of products. At the same time, the resin compositions satisfy a value of about $1\times10^4$ Pa to about $1\times10^5$ Pa when irradiated with about 4000 mJ/cm$^2$ of UV to have suitable elasticity in the post-curing and be easily folded.

Accordingly, the display device of an embodiment includes an adhesive member formed through a resin composition of an embodiment to exhibit satisfactory reliability without peeling or lifting of the adhesive member in a curved portion. The display device has no peeling between the adhesive member and adjacent members even when the display device is bent or folded, and exhibits suitable operational reliability.

A resin composition of an embodiment has low viscosity properties, and may thus exhibit suitable coating properties for substrates of various shapes.

An adhesive member of an embodiment may have high adhesive strength.

A display device of an embodiment includes an adhesive member having high adhesive strength, and may thus exhibit reliability in various operation states.

Although the embodiments have been described with reference to examples, it will be understood that the embodiments should not be limited to thereto, but various changes and modifications can be made by those skilled in the art without departing from the spirit and scope of the embodiments.

Accordingly, the technical scope is not intended to be limited to the contents set forth in the detailed description of the specification, but is intended to be defined by the appended claims.

What is claimed is:

1. An adhesive member comprising:
    a polymer, the polymer being derived from a resin composition containing a urethane (meth)acrylate oligomer, wherein
    the resin composition, before curing, has a viscosity of about 20 mPa·s or less at about 30° C. to about 50° C., wherein
    the resin composition of the adhesive member has a storage modulus of about $2\times10^3$ Pa to about $2\times10^4$ Pa at 25° C. and 1 Hz when irradiated with about 200 mJ/cm$^2$ of ultraviolet light,
    the resin composition of the adhesive member has a storage modulus of about $1\times10^4$ Pa to about $1\times10^5$ Pa at 25° C. and 1 Hz when irradiated with about 4000 mJ/cm$^2$ of ultraviolet light, and
    the adhesive member has a peel strength of about 1 kg/25 mm or greater when the resin composition is cured, and
    wherein the resin composition includes no organic solvent.

2. The adhesive member of claim 1, wherein the ultraviolet light has a central peak of about 360 nm to about 400 nm.

3. The adhesive member of claim 1, wherein an amount of the urethane (meth)acrylate oligomer is about 5 wt % to about 20 wt % of a total amount of the resin composition.

4. The adhesive member of claim 1, wherein the cured resin composition comprises a (meth)acrylate monomer containing a hydroxy group.

5. The adhesive member of claim 1, wherein the polymer is formed by photocuring the resin composition.

6. A display device comprising:
    a display panel;
    a window disposed on the display panel; and
    an adhesive member disposed between the display panel and the window, wherein
    the adhesive member is derived from a resin composition containing a urethane (meth)acrylate oligomer,
    the resin composition, before curing, has a viscosity of about 20 mPa·s or less at about 30° C. to about 50° C.,
    the resin composition of the adhesive member has a storage modulus of about $2\times10^3$ Pa to about $2\times10^4$ Pa at 25° C. and 1 Hz when irradiated with about 200 mJ/cm$^2$ of ultraviolet light,
    the resin composition of the adhesive member has a storage modulus of about $1\times10^4$ Pa to about $1\times10^5$ Pa at 25° C. and 1 Hz when irradiated with about 4000 mJ/cm$^2$ of ultraviolet light, and
    the adhesive member has a peel strength of about 1 kg/25 mm or greater when the resin composition is cured, and
    wherein the resin composition includes no organic solvent.

7. The display device of claim 6, wherein the adhesive member has a thickness of about 50 μm to about 200 μm.

8. The display device of claim 6, further comprising an input sensor disposed on the display panel,
    wherein the adhesive member is disposed between the display panel and the input sensor or between the input sensor and the window.

9. The display device of claim 8, wherein
    the display panel comprises a display element layer and an encapsulation layer disposed on the display element layer,
    the input sensor is directly disposed on the encapsulation layer, and
    the adhesive member is disposed on the input sensor.

10. The display device of claim 6, wherein the display panel includes at least one folding area which has a radius of curvature of about 5 mm or less.

11. The display device of claim 6, further comprising:
    a light control layer disposed between the adhesive member and the window; and
    an optical adhesive layer disposed between the light control layer and the window,
    wherein the optical adhesive layer comprises a polymer derived from the resin composition.

* * * * *